United States Patent [19]

Pitchford

[11] 3,930,984

[45] Jan. 6, 1976

[54] COAL-ANTHRACENE OIL SLURRY LIQUEFIED WITH CARBON MONOXIDE AND BARIUM-PROMOTED CATALYSTS

[75] Inventor: Armin C. Pitchford, Bartlesville, Okla.

[73] Assignee: Phillips Petroleum Company, Bartlesville, Okla.

[22] Filed: Nov. 6, 1972

[21] Appl. No.: 303,759

Related U.S. Application Data

[62] Division of Ser. No. 77,360, Oct. 1, 1970, Pat. No. 3,728,252.

[52] U.S. Cl. .................................................. 208/10
[51] Int. Cl............................................... C10g 1/08
[58] Field of Search ...................................... 208/10

[56] References Cited
UNITED STATES PATENTS

| | | | |
|---|---|---|---|
| 1,890,434 | 12/1932 | Krauch et al. | 208/10 |
| 2,057,996 | 10/1936 | Bayer | 208/10 |
| 2,132,855 | 10/1938 | Krauch et al. | 208/10 |
| 3,488,279 | 1/1970 | Schulman | 208/10 |
| 3,488,280 | 1/1970 | Schulman | 208/10 |
| 3,642,607 | 2/1972 | Seitzer | 208/10 |
| 3,687,838 | 8/1972 | Seitzer | 208/10 |
| 3,694,342 | 9/1972 | Sprow et al. | 208/10 |

OTHER PUBLICATIONS

H. R. Appell et al., *Chem. and Ind.*, Nov. 22, 1969, p. 1703.

*Primary Examiner*—Veronica O'Keefe

[57] ABSTRACT

A heavy hydrocarbon feedstock is upgraded by at least one of the processes of desulfurization, decreasing carbon residues, increasing API gravity, and liquefaction of solid feedstock by reacting the feedstock at elevated temperature and pressure in the presence of carbon monoxide and in the presence of a catalytically active metal. In one embodiment the active metallic catalyst is associated with minor amounts of alkali or alkaline earth metals to minimize promotion of cracking side reactions. In a preferred embodiment a heavy hydrocarbon feedstock is upgraded in the presence of the catalyst system formed from a barium salt which has been deposited on cobalt molybdate dispersed on an alumina support.

7 Claims, No Drawings

COAL-ANTHRACENE OIL SLURRY LIQUEFIED WITH CARBON MONOXIDE AND BARIUM-PROMOTED CATALYSTS

This is a divisional application of my copending application having Ser. No. 77,360, filed on Oct. 1, 1970, now U.S Pat. No 3,728,252, issued Apr. 17, 1973.

CROSS-REFERENCES TO RELATED APPLICATIONS

In my application Ser. No. 757,113, filed Oct. 3, 1968, now U.S. Pat. No. 3,586, 621, issued June 22, 1971, is disclosed a method for desulfurizing heavy hydrocarbon feeds by contacting such feeds with steam in the presence of suitable catalysts. The effectiveness of that process is believed to be due to the occurrence of reactions such as the water-gas shift reaction and the hydrogenation reaction.

It has now been found that still more improved results can be obtained by contacting heavy hydrocarbon-containing feeds with carbon monoxide in either the presence or absence of steam over suitable catalysts. Not only are beneficial results obtained at temperatures which are generally lower than those of the above-described filed case, but also benefits other than desulfurization are obtained.

BACKGROUND OF INVENTION

This invention relates to the upgrading of heavy hydrocarbon feedstocks. In one of its aspects, this invention relates to multiple purpose catalysts. In another of its aspects, this invention relates to effecting multiple reactions with a single catalyst system. In still another of its aspects, this invention relates to desulfurization of hydrocarbon feedstocks. In still another of its aspects, this invention relates to decreasing carbon residues in hydrocarbon feedstocks. In yet another of its aspects, this invention relates to liquefaction of solid hydrocarbons in feedstock materials. In yet another of its aspects, this invention relates to increasing the API gravity of hydrocarbon feedstocks.

In one of its concepts, this invention provides a method for performing at least one reaction chosen from: desulfurizing a hydrocarbon feedstock, decreasing the carbon residues in a hydrocarbon feedstock, increasing the API gravity of a hydrocarbon feedstock, or liquefying a solid hydrocarbon in hydrocarbon feedstock material using an active metal catalyst. Another of its concepts, this invention provides a method for simultaneously catalyzing multiple chemical reactions using active metal catalysts.

Catalytic methods that can desulfurize, increase the API gravity, or decrease the carbon residues in hydrocarbon feedstocks are known. Methods for liquefying solid hydrocarbons and hydrocarbon feedstocks are also known. These known methods are, however, directed to specific reactions and do not possess the versatility of generally upgrading a hydrocarbon feedstock by promotion of a combination of reactions.

It is therefore an object of this invention to provide an economical method for the upgrading of hydrocarbon feedstocks. It is another object of this invention to provide a method for effecting a multiple upgrading of hydrocarbon feedstocks.

Other aspects, concepts and objects of the invention are apparent from the study of this disclosure and the appended claims.

SUMMARY OF THE INVENTION

According to the present invention there is provided a method for upgrading heavy hydrocarbon feedstock which comprises reacting the feedstock at an elevated temperature and pressure in the presence of carbon monoxide and in the presence of an active metal selected from molybdenum, tungsten, nickel, cobalt, copper, iron, and zinc.

In a further embodiment of this invention the reaction of the feedstock at an elevated temperature and pressure takes place in the presence of carbon monoxide and an active metal catalyst from the list above and steam.

The process of the invention will upgrade the applicable feedstocks in one or more ways. The process can substantially desulfurize the feedstocks. It can decrease the carbon residue and increase the API gravity of a crude oil. It can reduce the sulfur content of a coal and/or convert a substantial portion of a coal to liquid hydrocarbon products.

The above benefits can be obtained without the need for hydrogen generation and compression apparatus. Moreover, these benefits are obtained with relatively low coke formation and with relatively low formation of cracked low molecular weight byproducts.

The feedstocks which can be upgraded according to the process of the invention are heavy hydrocarbon-containing feedstocks. These can be crude oils, heavy hydrocarbon oils, residual hydrocarbon fractions, as well as solid carbonaceous materials such as coal. These feedstocks can contain aliphatic and aromatic hydrocarbons as well as acyclic and alicyclic paraffins and olefinic compounds such as those containing up to 40 or more carbon atoms per molecule or those having molecular weights as high as 500 or more. The feedstock can also comprise pulverized coal dispersed in a hydrocarbon oil particularly in a hydrocarbon oil capable of participating in hydrogen exchange reactions as a hydrogen donor, such as an aromatic oil or a hydrogenated aromatic oil. The heavy hydrocarbon-containing feedstocks will generally be naturally occurring and will generally contain a substantial sulfur content, although any crude oil and any coal, including bituminous and anthracite, is applicable.

The catalysts which are applicable for use in the present invention are those which contain catalytically active metals selected from molybdenum, tungsten, nickel, cobalt, copper, iron, zinc, and mixtures thereof. These elements can be present in the metallic state or in the form of oxides, or carbonyls, or sulfides, or salts of carboxylic acids such as naphthenic acids, or chemically combined with each other, or chemically or physically combined with other metals such as the alkali or alkaline earth metals, particularly barium. Some examples of these are molybdenum oxide, cobalt molybdate, nickel sulfide, zinc molybdate, copper oxide barium oxide, copper molybdate, magnesium tungstate, iron oxide barium molybdate, tungsten oxide, zinc sulfide, molybdenum hexacarbonyl, cobalt oxide, cobalt naphthenate, nickel naphthenate, barium naphthenate, and the like and mixtures thereof.

Such catalytically active materials can be associated, if desired, with catalytic support materials, preferably of the non-acidic type, such as alumina, calcium aluminate, barium aluminate, magnesium aluminate, bauxite, and the like and mixtures thereof. When such support materials are present, they can constitute from 40 to about 95 weight percent of the total catalyst composite.

In some instances, the catalysts, either supported or unsupported, can be associated with sufficient, though generally minor amounts, of alkali or alkaline earth metals to minimize or eliminate acid sites which would otherwise promote cracking side reactions.

Such solid catalysts can be prepared by any suitable means known in the art. For example, they can be prepared by coprecipitation, impregnation, or dry mixing. Whichever method of preparation is used, the compositions should be catalytic in that they will have a surface area of at least about 1 square meter per gram. They are generally activated prior to use by calcination in air at 800°–1500°F. Catalyst regeneration is similarly carried out.

Presently preferred catalyst systems are those containing molybdenum associated with barium. Particularly good results are obtained using a catalyst comprising cobalt molybdate dispersed on a predominantly alumina support material and impregnated with sufficient barium salt solution, such as a solution of barium nitrate or barium acetate or other carboxylic acid barium salt, to provide from about 1 to about 20, preferably from about 2 to about 15, weight percent barium. Another catalyst which has been found to be particularly effective is an unsupported barium molybdate catalyst in which the barium and molybdenum are present in approximately stoichiometric quantities.

The catalysts of the present invention are bifunctional in that they have activity for both the water gas shift reaction and hydrogenation.

The hydrocarbon conversion process of the present invention is carried out in liquid phase which in this application means as a totally liquid mixture or as a slurry of solid hydrocarbons in a liquid hydrocarbon carrier and in the presence of carbon monoxide. The process can be carried out both batchwise, such as in an autoclave, or it can be carried out continuously such as in a fixed bed reactor. Any convenient type of reactor can be used. In any event, sufficient carbon monoxide will be present to provide a reaction pressure in the range of about 1000 to about 5000 psig, preferably in the range of about 1500 to about 3500 psig. Steam, when used, will be present in the reaction zone in amounts corresponding to a ratio of liquid water: liquid hydrocarbon feed of from about 1:5 to about 1:100 by volume. In batch operations, the ratio of solid catalyst to feedstock will be in the range of about 0.1 to about 20, preferably from about 1 to about 5, weight percent catalyst based upon the weight of the feedstock and the reaction time will generally be in the range of about 0.1 to about 20 hours. In continuous fixed-bed processes, the liquid hourly space rate of the feed will generally be in the range of from about 0.2 to about 10 LHSV.

The conversion temperature will generally be in the range of from about 550° to about 800°F, preferably from about 675° to 720°F. In the lower portion of the temperature range, the reaction can be relatively slow, while in the upper portion of the temperature range, the extent of coking can become more significant.

The products from the reaction zone generally include upgraded liquid products, some gaseous products, and minor amounts of coke. The gaseous products can include removed sulfur in the form of carbonyl sulfide and/or hydrogen sulfide.

The following specific examples show the preparation of the specific catalysts of this invention and the method of using catalysts of this invention in desulfurization, reducing carbon residues and increasing the API gravity using liquid feedstock, and liquefying solid hydrocarbon feedstock. These examples are meant to be illustrative and are not exclusive.

EXAMPLE 1

Preparation of Barium-Treated Cobalt Molybdate Catalyst

A barium-treated cobalt molybdate catalyst was prepared by impregnatng a commercially available cobalt molybdate catalyst with a solution of barium acetate. Specifically, an alumina-supported cobalt molybdate catalyst (AERO HDS-1441 from American Cyanamide Company) in the form of an 11–32 inch extrudate wad impregnated in this manner by subjecting a 200-gram quantity of the catalyst to contact with a solution containing 55 g of barium acetate in 85 ml water. After impregnation and drying, the impregnated extrudate was calcined at 1100°F for about 4–5 hours. The composition of this catalyst, both before and after the incorporation of the barium, is shown in the following Table 1.

TABLE 1

Composition and properties of Cobalt Molybdate Catalyst and its Barium Promoted Derivatives

|  | Cobalt Molybdate(a) | Ba-Promoted Cobalt Molybdate |
|---|---|---|
| Surface area, m²/gram | 290 | 228 |
| Pore volume, cc/gram | 0.56 | 0.48 |
| Pore diameter, A | 77 | 84 |
| Aluminum, weight percent | 35.8 | 32.6 (b) |
| Silicon, weight percent | 1.3 | 1.2 (b) |
| Molybdenum, weight percent | 7.9 | 7.2 |
| Cobalt, weight percent | 2.0 | 1.8 |
| Barium, weight percent | 0.0 | 12.0 |

(a) Emission spectrographic analysis indicated the presence of trace quantities of Fe, Ca, Mg, and Cu.
(b) Calculated values.

EXAMPLE 2

Desulfurization of Crude Oil with Carbon Monoxide over Barium-Promoted Cobalt Molybdate Catalyst A 50/50 blend of Eocene and Ratawi crude oils were treated according to the process of the present invention using the catalyst described in the preceding example. The conversions were carried out in a stirred autoclave for five hours under several sets of conditions. The essential details and the results of these tests are shown in Table 2 on the following page.

TABLE 2

| Run No. | Feed (a) | 1 | 2 | 3 | 4 | 5 | 6 (b) |
|---|---|---|---|---|---|---|---|
| Operating Conditions | | | | | | | |
| Temperature, °F | — | 675 | 728 | 678 | 708 | 660 | 708 |
| Pressure, psig | — | 2100 | 2300 | 2100 | 2200 | 20002 | 23502 |
| Time, hours | — | 10 | 10 | 10 | 10 | 10 | 10 |
| Feed/catalyst, grams | — | 60/0 | 70/3 | 60/3 | 60/3 | 60/3 | 60/3 |
| Products | | | | | | | |
| Coke, wt% | — | 2.5 | 11.8 | 4.5 | 7.66 | 1.0 | 2.0 |
| Liquids | | | | | | | |
| API 60°F gravity | 20.4 | — | 31.9 | 26.0 | 26.5 | 18.9 | 27.7 |
| Carbon, wt% | 83.7 | 84.3 | 86.45 | 85.4 | 85.4 | 84.9 | 84.7 |
| Hydrogen, wt% | 11.6 | 11.2 | 10.92 | 11.54 | 11.9 | 10.7 | 12.09 |
| Sulfur, wt% | 4.0 | 3.4 | 2.4 | 2.9 | 2.5 | 3.8 | 2.8 |
| Sulfur removal, % | — | 15.0 | 40.0 | 27.5 | 37.5 | 5.0 | 32.4 |
| Carbon residue, % | 9.07 | 9.70 | 6.30 | 11.54 | 6.82 | 9.78 | 6.0 |
| Gases, Mole% | | | | | | | |
| $H_2$ | — | 0.8 | 0.3 | 0.5 | 0.4 | 0.5 | 1.5 |
| CO | — | 92.9 | 7.3 | 46.3 | 29.2 | 90.4 | 9.6 |
| $CO_2$ | — | 1.1 | 9.1 | 21.5 | 21.0 | 4.5 | 53.4 |
| COS | — | 0.8 | 9.6 | 6.0 | 6.9 | 0.3 | 2.4 |
| $H_2S$ | — | 0.0 | 2.0 | 0.3 | 0.3 | 0.0 | 4.1 |
| Methane | — | 0.6 | 2.3 | 44.2 | 5.8 | 0.8 | 3.4 |
| Ethane | — | 0.4 | 23.6 | 6.9 | 11.5 | 0.4 | 8.1 |
| Ethylene | — | 0.0 | 0.0 | 0.1 | 0.0 | 0.0 | 0.0 |
| Propane | — | 0.4 | 25.6 | 5.3 | 11.8 | 0.3 | 7.5 |
| Propylene | — | 0.0 | 0.0 | 0.0 | 0.0 | 0.0 | 0.1 |
| Heavier | — | 0.9 | 18.9 | 6.8 | 11.0 | 0.7 | 7.1 |
| $N_2/O_2$ | — | 1.9/0.2 | 0/1.2 | 1.4/0.7 | 1.3/0.8 | 1.9/0.2 | 0.9/0.2 |

(a) Feed — a 50/50 blend of Eocene and Ratawi crudes.
(b) 4.8 percent $H_2O$ added.

The data in the table above show that the process of the invention was successful in substantially decreasing the sulfur content of the feedstock. Further, it is seen that Runs 2–6 using the invention process have, in several instances, increased the API gravity of the oil as well as reducing its carbon residue value. This was generally accomplished with the production of relatively small quantities of coke. The presence of substantial amounts of carbonyl sulfide in the invention runs indicate that the substantial portion of the sulfur is removed from the crude oil in the form of this compound. In the invention Run 6 which 4.8% water (based upon the feed) was added, there appears to be a reduction in the amount of coke which was formed.

Run 5 indicates that, under these specific conditions, a temperature higher than 660°F is desirable.

EXAMPLE 3

Conversion of Crude Oil with Carbon Monoxide-Steam over Barium-Promoted Cobalt Molybdate In another series of runs, the same 50/50 blend of crude oils was subjected to the process of the invention utilizing both carbon monoxide oand steam in 5-hour autoclave reactions. The essential details and the results of these tests are shown in the following Table 3.

TABLE 3

| Run No. | Feed | 7 | 8 | 9 |
|---|---|---|---|---|
| $H_2O$-Crude ratio | — | 1–6 | 1–6 | 1–6 |
| Temperature, °F | — | 575 | 640 | 690 |
| Initial CO Pressure, psig (43–78°F) | — | 1000 | 1000 | 1000 |
| Operating Pressure, psig | — | 3000 | 3500 | 3775 |
| Final gas pressure (71–74°F) psig | — | 1150 | 1225 | 1190 |
| Catalyst, % of feed | — | 5.0 | 5.0 | 5.0 |
| Liquid product recovered, % | — | 96.6 | 95.5 | 94.4 |
| Coke, % of feed | — | 1.0 | 1.7 | 4.16 |
| API gravity, 60°F | 20.4 | 24.4 | 19.8 | 26.1 |
| Carbon residue, % | 9.07 | 7.99 | 8.72 | 6.44 |
| Carbon wt% | 83.70 | — | — | 84.6 |
| Hydrogen, wt% | 11.60 | — | — | 11.7 |
| Oxygen, wt% | 0.14 | — | — | 0.15 |
| Nitrogen, wt% | 0.22 | — | — | 0.20 |
| Sulfur, wt% | 4.00 | 3.5 | 3.5 | 2.35 |
| Sulfur removal, % of total | — | 12.5 | 12.5 | 41.25 |
| Molecular weight | 656 | — | — | 313 |
| Gas Analysis | | | | |
| $H_2$ | — | 24.0 | 15.1 | 2.3 |
| CO | — | 15.5 | 15.2 | 6.4 |
| $CO_2$ | — | 56.2 | 64.3 | 69.9 |
| $H_2S$ | — | 0.3 | 1.2 | 5.2 |
| $N_2$ | — | 2.3 | 1.1 | 1.9 |
| $O_2$ | — | 0.1 | 0.1 | 0.0 |
| Methane | — | 0.3 | 0.0 | 1.8 |
| Ethane/Ethylene | — | 0.3 | 0.6/0.0 | 3.7/0.0 |
| Propane/Propylene | — | 0.2/0 | 0.6/0.0 | 3.2/0.0 |
| Heavier | — | 0.9 | 1.2 | 5.5 |

The results of these tests show that as much as 40% of the sulfur can be removed at temperatures which are about 150°–200°F lower than what had been previously observed in the absence of carbon monoxide. The low yields of methane, ethane, and propane in the gas effluent indicate that essentially no cracking takes place. Similarly, lower coke yields were obtained than with previous processes carried out in the absence of carbon monoxide.

EXAMPLE 4

Conversion of Coal-Oil Slurry with CO over Barium-Promoted Cobalt Molybdate Catalyst A slurry of powdered coal in anthracene oil was desulfurized according to the process of the present invention in a 5-hour autoclave run at 2200–2275 psig. The essential conditions of the run and the results are shown in the following Table 4.

TABLE 4

|  | Feed Composition A Anthracene Oil(a) | B Coal(b) | Slurry of A + B(c) | Run 10 | Run 11 |
|---|---|---|---|---|---|
| Wt % | 86.3 | 13.7 | 100 | 97.6 | 93.3 |
| Benzene Insoluble matter, wt % | Nil | 99+ | 13.7 | 8.63 | 10.75 |
| Pyridine insoluble matter, wt % | Nil | 99+ | 13.7 | 3.2 | 5.0 |
| Catalyst, wt % | — | — | — | 0 | 5 |
| Temperature, °F | — | — | — | 670 | 750 |
| Conversion of coal(d) |  |  |  |  |  |
| To benzene solubles, % | — | — | — | 37.2 | 21.5 |
| To pyridine solubles, % | — | — | — | 46.7 | 63.5 |
| Composition and Properties |  |  |  |  |  |
| Carbon, wt % | 90.6 | 68.0 | 87.6 | 89.6 | 91.26 |
| Hydrogen, wt % | 6.1 | 5.0 | 5.88 | 5.9 | 6.26 |
| Oxygen, wt % | 1.2 | 11.28(e) | 2.58 | 2.2 | 1.7 |
| Nitrogen, wt % | 0.78 | 1.0 | 0.81 | 0.73 | 0.98 |
| Sulfur, wt % | 0.69 | 2.97 | 0.90 | 0.61 | 0.54 |
| Ash, wt % | Nil | 11.75 | 1.61 | 1.56 | — |
| Carbon residue, % | 2.78 | 65.55 | 11.40 | 10.89 | 6.62 |
| Molecular wt | 1.69 | — | — | — | — |
| Sulfur removal, % | — | — | 0 | 32.89 | 40.0 |

(a) Anthracene oil contained primarily phenanthrene.
(b) Washed southern Illinois coal.
(c) Physical mixture, assuming no reaction.
(d) Moisture-free basis.
(e) By difference.

Analyses of the gaseous products from these runs are shown in the following table. The original gas was comprised solely of CO which was used to pressurize the autoclave to 100 psig at about 75°F at the start of the test.

| Run No. | 10 | 11 |
|---|---|---|
| Composition, mol % |  |  |
| Hydrogen | 0.9 | 2.1 |
| CO | 63.4 | 46.6 |
| $CO_2$ | 26.8 | 31.9 |
| COS | 5.5 | 3.6 |
| $H_2S$ | 1.1 | 1.7 |

| Run No. | 10 | 11 |
|---|---|---|
| Methane | 0.3 | 5.1 |
| Ethane | 1.6 | 4.4 |
| Ethylene | 0.0 | 0.0 |
| Propane | 0.6 | 2.2 |
| Propylene | 0.0 | 0.0 |
| Heavier | 0.8 | 1.0 |

These data clearly indicate that COS is the primary reaction product. Carbon dioxide can be derived from the reaction of CO with oxygen-containing derivatives of the coal products. $H_2S$ can be formed by hydrogen exchange with the aromatic compounds such as phenanthrene which is a major component in the anthracene oil.

EXAMPLE 5

Liquefaction of Coal with CO-Steam over Barium-Promoted Cobalt Molybdate Catalyst In this example, a slurry of coal (a washed coal obtained from southern Illinois) in anthracene oil was subjected to the process of the present invention in a 5-hour autoclave run. The reaction conditions included the presence of carbon monoxide, steam, and catalyst. The catalyst was the same as that prepared in Example 1. The essential conditions and results of these runs are shown in Table 5 below.

TABLE 5

| Run No. | Feed (b) | 12 | 13 |
|---|---|---|---|
| Operating Conditions |  |  |  |
| Coal/Anthracene oil ratio | — | 1/6.4 | 1/6.3 |
| Water/total hydrocarbon feed | — | 0.163 | 0.17 |
| Catalyst, BaO on R-4311, wt % | — | 0.0 | 5.2 |
| Temperature, °F | — | 708 | 700 |
| Pressure, psig | — | 3250 | 3375 |
| Liquid Product |  |  |  |
| Total recovery, wt % | — | 100.00 | 95.0 |
| Benzene insolubles, wt % | 16.3 | 5.45 | 3.59 |
| Pyridine insolubles, wt % | 16.3 | 2.44 | 1.75 |
| Conversion of Coal (a) |  |  |  |
| To benzene sols., % | — | 60.0 | 74.0 |
| Carbon residue, (Rams.) % | 13.25 | 8.17 | 10.1 |
| To pyridine sols., % | — | 82.4 | 87.4 |
| H/C mole ratio | 0.82 | 0.81 | 0.87 |

TABLE 5-continued

| Run No. | Feed (b) | 12 | 13 |
|---|---|---|---|
| Sulfur, wt % | 1.07 | 0.55 | 0.44 |

(a) Moisture-free basis.
(b) Calculated Properties of physical 83.3% anthracene oil and 16.7% coal.

The data in the above Table show that the catalytic invention Run 13 converted 74.0% of the coal into benzene soluble matter, in addition to substantially reducing the sulfur content of the coal slurry.

EXAMPLE 6

Liquefaction of Coal with CO-Steam Using Soluble Catalysts

In a manner closely analogous to that of the preceding example, a similar coal/anthracene oil slurry was converted in a 5-hour autoclave run employing carbon monoxide, steam, and several combinations of oil-soluble metal naphthenates. The essential conditions and results of these runs are shown in Table 6 below.

EXAMPLE 7

Conversion of Crude Oil with CO-Steam over Barium Molybdate Catalyst

In this series of runs, a 50/50 mixture of Eocene and Ratawi crude oils were desulfurized according to the process of the present invention using an unsupported barium molybdate (46.2 weight percent Ba) catalyst. The tests were conducted in a 300°C rocking autoclave equipped with a quartz liner. The crude oil, catalyst, and water, if used, were added to the autoclave which was then closed and flushed several times with nitrogen. After pressuring to 1000 psig with CO at room temperature, heat was applied as rapidly as possible

TABLE 6

| Run No. | Feed(a) | 14 | 15 | 16 | 17 |
|---|---|---|---|---|---|
| Test Conditions | | | | | |
| Coal/anthracene oil ratio | — | 1/4.5 | 1/4.5 | 1/4.5 | 1/4.5 |
| Water/hydrocarbon ratio | — | 1/5.5 | 1/5.5 | 1/5.5 | 1/5.5 |
| Catalyst (as naphthenates) | — | Ba/Ni | Ba/Co | Ba/Mo | Ba/Fe |
| Catalyst added, wt %(b) | — | 5.5/3.6 | 5.5/3.6 | 5.5/3.6 | 5.5/3.6 |
| Temperature, °F | — | 705 | 710 | 710 | 710 |
| Pressure, psig | — | 3200 | 3400 | 3400 | 3400 |
| Liquid Product | | | | | |
| Total recovery, wt % | — | 98.6 | 101.5(c) | 98.5 | 95.0 |
| Benzene insolubles, wt % | 16.3 | 5.63 | 5.49 | 5.8 | 5.67 |
| Pyridine insolubles, wt % | 16.3 | 3.79 | 2.99 | 5.4 | 3.79 |
| n-Hexene insolubles, wt % | 16.3 | 10.7 | 12.5 | — | — |
| Conversion of Coal(d), % | | | | | |
| To benzene solubles | — | 68.0 | 67.1 | 65.3 | 66.0 |
| To pyridine solubles | — | 77.1 | 82.0 | 67.7 | 77.4 |
| To hexane solubles | — | 35.5 | 25.0 | 13.6 | — |
| Carbon residue, % | 13.02 | — | 9.08 | 8.49 | 8.82 |
| Sulfur, wt % | 1.00 | 0.63 | 0.43 | 0.53 | 0.43 |

(a) Properties of blend as calculated from composition of feed used in tests.
(b) As corresponding metal naphthenates.
(c) Contains some coke derived from the CO.
(d) Moisture-free basis.

The data above show that the combination of barium naphthenate salts together with nickel, cobalt, molybdenum, or iron naphthenate salts also catalyze the liquefaction of coal in the presence of carbon monoxide.

until the desired operating temperature was reached. The tests were of 5 hours duration. The pressures shown in the table were at the beginning of the reaction period. As water was consumed, pressures were distinctly lower towards the end of the tests.

TABLE 7

| Run No. | Feed | 18 | 19 | 20 | 21 | 22 | 23 |
|---|---|---|---|---|---|---|---|
| Operating Details | | | | | | | |
| Temperature, °F | — | 708(a) | 711 | 709 | 728 | 728 | 728 |
| Pressure, psig | — | 2200 | 2200 | 2650 | 4100 | 3900 | 3850 |
| $BaMoO_4$, wt % | — | none | 4.75 | 4.55 | 4.0 | 2.7 | 2.7 |
| Metal naphthenate | — | none | none | none | none | Co | Ni |
| Wt. % naphthenate | — | none | none | none | none | 1.37 | 1.37 |
| Water, wt % | — | none | none | 4.55 | 16.0 | 13.7 | 13.7 |
| Coke, wt % | — | 7.2 | 1.67 | 2.3 | 2.33 | 1.55 | 3.0 |
| Liquid Product | | | | | | | |
| Wt. % | — | 85 | 96.0 | 96.2 | 96.3 | 96.0 | 95.5 |
| API gravity, 60°F | 20.4 | 26.0 | 24.4 | 24.8 | 23.7 | 23.4 | 24.0 |
| Carbon, wt % | 83.7 | 84.8 | 83.7 | 84.3 | 86.2 | 85.5 | — |
| Hydrogen, wt % | 11.6 | 11.7 | 11.7 | 11.9 | 10.7 | 11.3 | — |
| Sulfur, wt % | 4.00 | 3.6(b) | 3.1 | 3.2 | 2.8 | 3.0 | 2.9 |
| Sulfur removed, % | — | 10.0(c) | 24.4 | 22.0 | 32.7 | 26.8 | 29.2 |
| Carbon residue, % | 9.07 | 6.14 | 8.17 | 7.72 | 6.57 | 7.01 | 6.84 |
| Gaseous Materials, mol % | | | | | | | |
| $H_2$ | — | 0.8 | 0.8 | 3.7 | 3.6 | 5.5 | 4.2 |
| CO | — | 70.7 | 75.2 | 19.8 | 4.8 | 5.1 | 2.5 |
| $CO_2$ | — | 3.3 | 3.6 | 50.8 | 62.7 | 64.6 | 50.6 |

TABLE 7-continued

| Run No. | Feed | 18 | 19 | 20 | 21 | 22 | 23 |
|---------|------|-----|-----|-----|-----|-----|------|
| COS | — | 3.1 | 3.9 | 0.3 | 0 | 0 | 0 |
| $H_2S$ | — | 0.3 | 0.3 | 6.5 | 6.8 | 7.0 | 9.6 |
| Methane | — | 6.0 | 3.0 | 1.6 | 0.6 | 0.9 | 0.7 |
| Ethane | — | 5.9 | 3.9 | 4.8 | 5.2 | 4.4 | 6.8 |
| Ethylene | — | 0.0 | 0.1 | 0.0 | 0 | 0 | 9 |
| Propane | — | 3.7 | 3.2 | 3.4 | 7.8 | 5.5 | 10.4 |
| Propylene | — | 3.7 | 0.1 | 0.8 | 0 | 0 | 0.3 |
| Heavier | — | 4.1 | 4.3 | 6.6 | 6.8 | 6.8 | 14.4 |

(a)10-hour run.
(b)Converted to 100% yield basis.
(c)Based on 3.6 value.

The data show that, without a catalyst, no substantial desulfurization occurs. Moreover, there is a greater level of cracking as evidenced by the greater quantities of lower hydrocarbons produced. On the other hand, the invention runs using the barium molybdate catalyst show substantial desulfurization, the sulfur being predominantly removed as carbonyl sulfide in the absence of steam and predominantly as hydrogen sulfide in the presence of steam. In the invention runs using both the barium molybdate and the metal naphthenates, substantial desulfurization occurs and it appears that coke formation is reduced.

Reasonable variation and modification are possible within the scope of the foregoing disclosure and the appended claims to the invention the essence of which is that a heavy hydrocarbon feedstock can be reacted in the presence of carbon monoxide and a catalyst comprising an active metal and an alkaline earth metal at elevated temperatures and pressures to improve the quality of the reactive material.

I claim:

1. A method for liquefying coal in which the coal is slurried in anthracene oil, said method comprising contacting said coal anthracene oil slurry with a catalytically active metal selected from the group consisting essentially of molybdenum, nickel, cobalt, and iron promoted with a barium compound in the presence of carbon monoxide at a temperature in the range of 675° to 720°F and a pressure in the range of about 1,000 to about 5,000 psig for a time sufficient to carry out the process of liquefaction of the coal.

2. The method of claim 1 wherein the catalytically active metal is present as cobalt molybdate and the barium compound is present as barium oxide.

3. The method of claim 1 wherein said catalytically active metal is associated with an aluminum catalytic support material which comprises from about 40 to about 95 weight percent of the total catalyst composition.

4. The method of claim 1 wherein said reaction is carried out batchwise and the ratio of solid catalyst to feedstock is in the range of about 0.1 to about 20 weight percent catalyst based on weight of feedstock and the reaction time is in the range of about 0.1 to about 20 hours.

5. The method of claim 1 wherein steam is added to the reaction zone in a ratio of liquid water to liquid hydrocarbon feed of from about 1:5 to about 1:100 by volume.

6. The method of claim 1 wherein said reaction is continuous in a fixed span and the liquid hourly space velocity of the feed is in the range of about 0.2 to about 10.

7. The method of claim 5 wherein steam is added to the reaction zone in a ratio of liquid water to liquid hydrocarbon feed of from about 1:5 to about 1:100 by volume.

* * * * *